(12) United States Patent
Park et al.

(10) Patent No.: US 8,735,164 B2
(45) Date of Patent: May 27, 2014

(54) FLUORIDE DISTILLATION APPARATUS AND QUANTIFYING METHOD OF SODIUM MONOFLUOROPHOSPHATE IN TOOTHPASTE USING SAME

(75) Inventors: Sang Chul Park, Yongin-si (KR); Boo Min Kim, Yongin-si (KR); Ji Hee Jung, Seongnam-si (KR); Min Kee Kim, Seoul (KR); Hye Jin Jeong, Suwon-si (KR)

(73) Assignee: Amorepacific Corporation, Seoul (KR)

( * ) Notice: Subject to any disclaimer, the term of this patent is extended or adjusted under 35 U.S.C. 154(b) by 0 days.

(21) Appl. No.: 13/511,446

(22) PCT Filed: Nov. 19, 2010

(86) PCT No.: PCT/KR2010/008180
§ 371 (c)(1),
(2), (4) Date: May 23, 2012

(87) PCT Pub. No.: WO2011/062435
PCT Pub. Date: May 26, 2011

(65) Prior Publication Data
US 2012/0270329 A1    Oct. 25, 2012

(30) Foreign Application Priority Data
Nov. 23, 2009    (KR) .......................... 10-2009-0113184

(51) Int. Cl.
*G01N 31/00*    (2006.01)

(52) U.S. Cl.
USPC .......................................................... 436/103

(58) Field of Classification Search
USPC .......................................................... 436/103
See application file for complete search history.

(56) References Cited

U.S. PATENT DOCUMENTS 4,394,921 A * 7/1983 Miskinis ....................... 215/296

FOREIGN PATENT DOCUMENTS

| JP | 2006-175364 | | 7/2006 | |
| JP | 2007-101504 | * | 4/2007 | ............ G01N 31/00 |
| KR | 10-2007-0121534 | | 12/2007 | |

OTHER PUBLICATIONS

English Translation of JP 2007-101504, Oki A., Fluorine assay method for coal, involves shaking combustion flask for two minutes after completion of combustion, such that absorber absorbs fluorine generated by combustion, 2007, translation obtained on Jun. 27, 2013.*
Skocir et al., Quantitative Determination of Fluorine in Toothpastes, Apr. 1993, vol. 16, Journal of High Resolution Chromatography, pp. 243-246.*
International Search Report for PCT/KR2010/008180, mailed Aug. 26, 2011.
Written Opinion for PCT/KR2010/008180, mailed Aug. 26, 2011.

* cited by examiner

*Primary Examiner* — Christine T Mui
(74) *Attorney, Agent, or Firm* — Nixon & Vanderhye P.C.

(57) ABSTRACT

The present invention relates to a fluoride distillation apparatus and a method for quantifying sodium monofluorophosphate among fluorides using the same, which increases the acid resistance of the hard tissues of the teeth and promotes remineralization of initial caries lesion.

9 Claims, 4 Drawing Sheets

A: Vaseline sealant     B: Acidified sample
C: Plastic cup     D: Trapping solution
E: Lid ID # FLUORIDE DISTILLATION APPARATUS AND QUANTIFYING METHOD OF SODIUM MONOFLUOROPHOSPHATE IN TOOTHPASTE USING SAME This application is the U.S. national phase of International Application No. PCT/KR2010/008180 filed 19 Nov. 2010 which designated the U.S. and claims priority to Korean Patent Application No. 10-2009-0113184 filed 23 Nov. 2009, the entire contents of each of which are hereby incorporated by reference.

TECHNICAL FIELD

The present invention relates to a fluoride distillation apparatus and a method for quantifying sodium monofluorophosphate among fluorides using the same, which increases the acid resistance of the hard tissues of the teeth and promotes remineralization of initial caries lesion.

BACKGROUND ART

For prevention of dental caries, fluorides, such as sodium fluoride (NaF) or sodium monofluorophosphate (SMFP), have been used as an ingredient of toothpaste. Recently, sodium monofluorophosphate is favored because sodium fluoride is liable to combine with calcium carbonate or alumina used as an abrasive to deteriorate the concentration of active fluorine.

In quantification of sodium monofluorophosphate in toothpaste, it is required to conduct a pretreatment process of eliminating, if any, interfering ions, such as free aluminum or calcium ions. However, such a pretreatment process takes too much time, requires the use of an apparatus too complicated and bulky, with a risk of explosion due to unskillful manipulation, and leads to a low precision of the measurement results.

The conventional method for quantifying sodium monofluorophosphate in toothpaste involves, as shown in Table 1, a pretreatment process, such as distillation or diffusion, and a subsequent quantification process using spectrophotometry, an ion-selective electrode, ion chromatography (IC), or the like to measure the quantity of sodium monofluorophosphate.

TABLE 1

| Step | Method | Pros | Cons |
|---|---|---|---|
| Pre-treatment | Distillation | Easy to remove interfering substances | Hazardous, processing one sample each time |
| | Diffusion | Requires neither separate equipment nor reagent | Takes long time and has low precision in presence of interfering ions |
| Measurement | Spectro-photometry | Easy to get measurement | Needs to operate again after pretreatment, and much affected by interfering ions |
| | Ion-selective electrode | Easy to get measurement | Sensitive to measurement environment (pH, ion strength, etc.) |
| | IC | Multiple analyses possible | Requires expensive equipment and skillful manipulation, and has errors due to peak overlap when using an acid in pretreatment |

The distillation method is designed to process only one sample each time and uses a distillation apparatus bulky and complicated as shown in FIG. 1. An unskillful manipulation may risk an explosion by pressure.

The diffusion method takes long time of more than 10 hours to perform a pretreatment process and leads to erroneous measurement when interfering ions exist during the measurement of the sodium monofluorophosphate concentration. To prevent leaks of the generated hydrogen fluoride gas, the measurement apparatus should be hermetically sealed as shown in FIG. 2, which makes it impossible to heat the apparatus for faster generation of hydrogen fluoride and thus requires long time to perform measurements.

The spectrophotometry method, which is based on fluoride ion-specific electrode and colorimetric methods for determining the concentration of sodium monofluorophosphate, uses an acid added to convert sodium monofluorophosphate to a measurable form, that is, free fluoride ions. But, the acid causes a release of aluminum or calcium ions from calcium carbonate or alumina used as an abrasive for toothpaste, so aluminum or calcium ions adversely combine with fluoride ions.

The ion-selective electrode method requires a pretreatment process that involves the use of a total ion strength adjustment buffer (TISAB) and the adjustment of the pH value in order to eliminate interfering ions and adjust the ion strength.

The ion chromatography method, which is used for direct quantification of sodium monofluorophosphate, has the difficulty of accurate measurement for the concentration of sodium monofluorophosphate bonded to the interfering ions and requires expensive equipment and skillful manipulation.

Such a pretreatment process is necessary to quantification of sodium monofluorophosphate, with difficulty of rapid and precise measurements.

Hence, there is a demand for developing a novel pretreatment process for more rapid and precise quantification of sodium monofluorophosphate.

DISCLOSURE

Technical Problem

Accordingly, the present invention has been made in an effort to develop a fluoride distillation apparatus for reducing the required time for pretreatment and quantifying sodium monofluorophosphate with precision.

It is therefore an object of the present invention to provide a fluoride distillation apparatus and a method for quantifying sodium monofluorophosphate using the same, which can reduce the required time for pretreatment and quantify sodium monofluorophosphate with precision.

Technical Solution

To achieve the above object, the present invention provides a fluoride distillation apparatus that comprises: a reaction bottle for containing a sample; an absorbing device coupled to the top of the reaction bottle and open at both ends thereof; and an absorber placed in the absorbing device.

The present invention is also directed to a method for quantifying sodium monofluorophosphate using the fluoride distillation apparatus.

Advantageous Effects

The fluoride distillation apparatus of the present invention can be used to quickly quantify sodium monofluorophosphate in toothpaste with precision.

MODE FOR INVENTION

Figure 1:
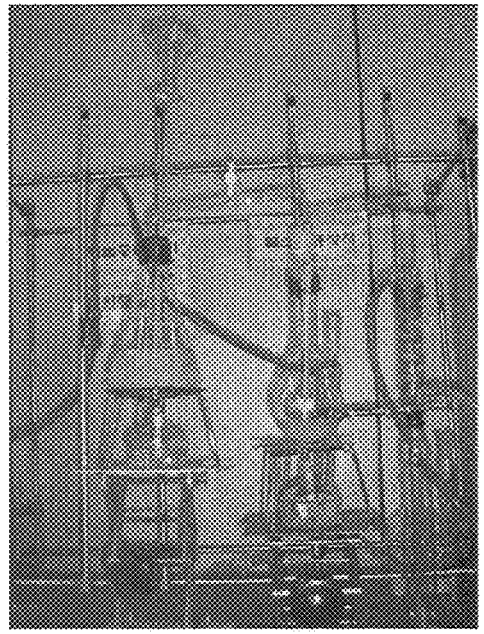
FIG. 1 is a photograph of a fluoride measurement apparatus used in the distillation method.
Figure 2:
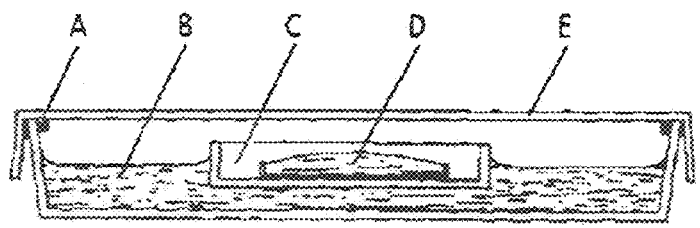
FIG. 2 shows the structure of a fluoride measurement apparatus used in the diffusion method.
Figure 3:
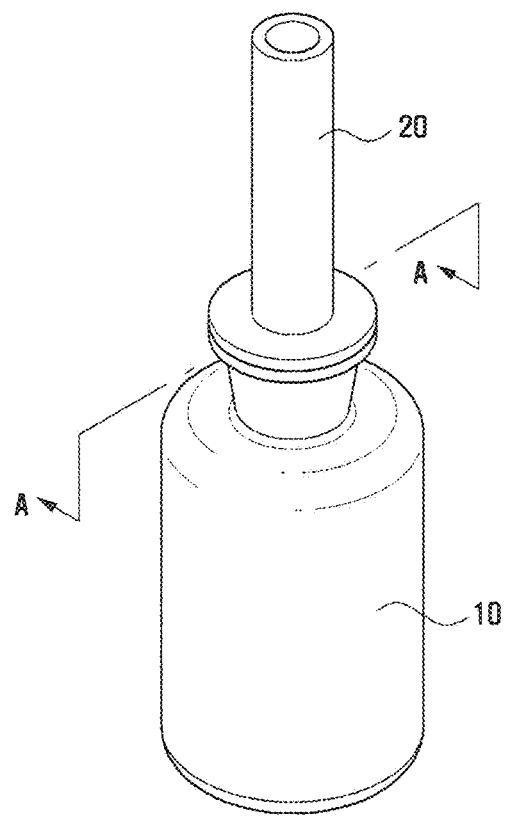
FIGS. 3, 4 and 5 show the structure of a fluoride distillation apparatus according to the present invention.

The present invention is directed to a fluoride distillation apparatus used in a pretreatment process for quickly quantifying sodium monofluorophosphate in toothpaste with precision. The fluoride distillation apparatus of the present invention includes, as shown in FIG. 3: a reaction bottle 10 for containing a sample; an absorbing device 20 coupled to the top of the reaction bottle 10 and open at its both ends; and an absorber placed in the absorbing device 20. Preferably, the material of the fluoride distillation apparatus of the present invention may include, if not specifically limited to, plastics such as PVDF, glass, or plastic-coated glass.

When the reaction bottle 10 in the fluoride distillation apparatus of the present invention is made of plastic, the bottom of the reaction bottle 10 is preferably constructed greater in thickness or provided with a weight for directing the center of gravity downward to keep the reaction bottle 10 from falling over during reaction in a thermostatic bath.

The absorbing device 20 in the fluoride distillation apparatus of the present invention may include an absorber 20 and an absorbent solution for capturing the hydrogen fluoride gas generated from the reaction bottle 10. If not specifically limited to, the absorber is absorbent cotton, and the absorbent solution is water or a sodium hydroxide solution.

Figure 4:
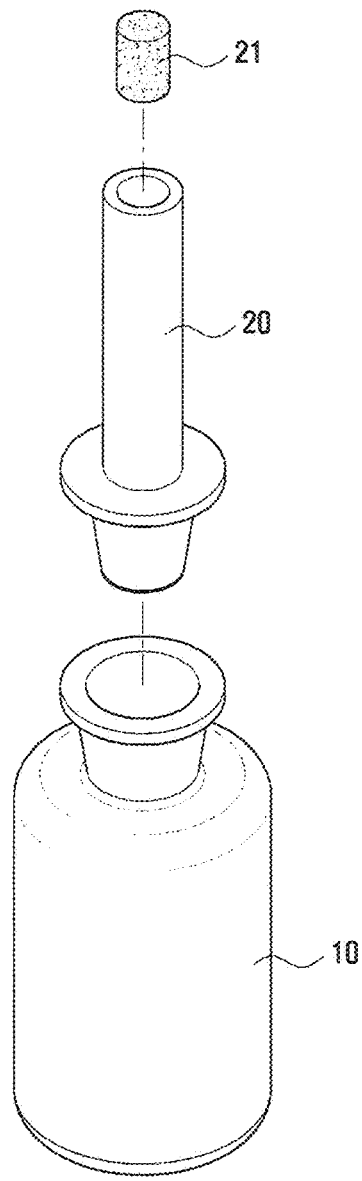
Figure 5:
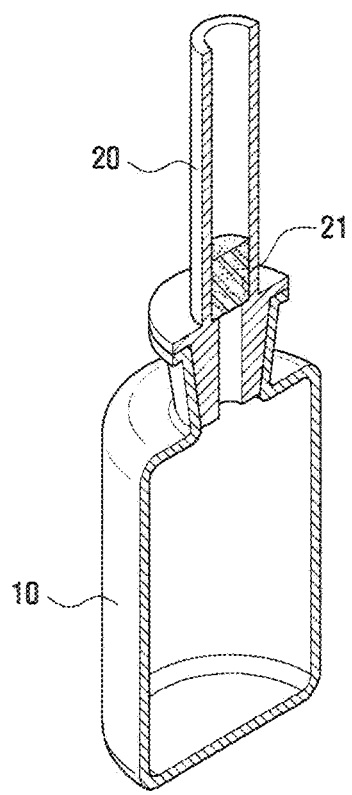

The absorbing device 20 of the present invention is open at its both ends and has a stopper for keeping the absorbent 21 contained in it from dropping into the reaction bottle. The stopper is designed in such a way that the opening of the bottom to be coupled to the reaction bottle 10 is narrower than the top of the absorbing device 20. In accordance with one embodiment of the present invention, as shown in FIGS. 4 and 5, the stopper is constructed in the double-tube form that the outer end is coupled to the reaction bottle to prevent leaks of the gas from the reaction bottle, while the inner end forms a tube narrower than the top to prevent the absorbent 21 from dropping into the reaction bottle.

In another embodiment of the present invention, the absorbing device is of a different structure other than the double-tube form; for example, a stopper is provided to keep the absorbent from dropping into the reaction bottle, or the bottom of the device is constructed greater in thickness.

Figure 6:
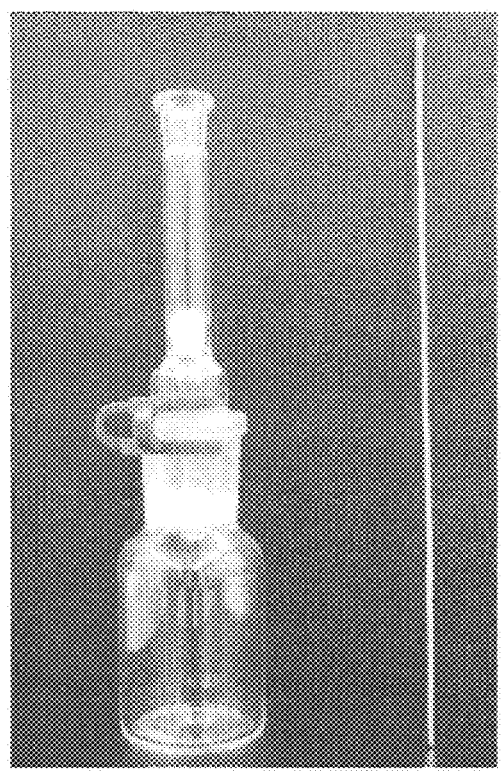
FIG. 6 is a photograph of a fluoride distillation apparatus used in one embodiment of the present invention.

In one embodiment of the present invention, the outer side of the absorbing device 20 corresponding to the inner side of the reaction bottle 10 is sand-smoothed, so that the reaction bottle 10 and the absorbing device 20 can be combined together not to be separable from each other, for preventing leaks of the hydrogen fluoride gas generated from the reaction bottle. The reaction bottle 10 and the absorbing device 20 can also be combined together just by turning against each other rather than by sanding. In another embodiment of the present invention, as shown in FIG. 6, the reaction bottle 10 and the absorbing device 20, sand-smoothed or not, are combined together via any fixing means commonly available, to prevent them being separated from each other by the expanded volume of the gas under heat.

The present invention is also directed to a method for quantifying sodium monofluorophosphate in toothpaste using the fluoride distillation apparatus.

The present invention provides a method for quantifying sodium monofluorophosphate with precision that involves applying TISAB to the test sample to convert the fluoride ions bonded to the interfering ions into free fluoride ions and then filtering out components potentially problematic in the acid hydrolysis step, thereby eliminating the effect of the complicated matrix, such as calcium carbonate or alumina used as an abrasive for toothpaste; conducting an acid hydrolysis to convert sodium monofluorophosphate into free fluoride ions measurable with a fluoride ion-specific electrode; and quantifying sodium monofluorophosphate with precision using the fluoride distillation apparatus of FIGS. 3 to 5 or FIG. 6.

The quantification method for sodium monofluorophosphate according to the present invention provides a quick and precise way to measure the concentration of fluoride ions using a simple pretreatment method and thus can be applied as a quality evaluation method to acquire the high quality of products.

The quantification method for sodium monofluorophosphate according to the present invention can reduce the required time for a pretreatment process to about 30 minutes and for an acid hydrolysis of sodium monofluorophosphate by applying a heat, which is available due to the open end of the absorbing device; and capture the hydrogen fluoride gas using a gas capturing portion. The method also makes it possible to utilize a plurality of the apparatuses depending on the size of the thermostatic bath and to conduct the pretreatment process for multiple samples at the same time.

The method for quantifying sodium monofluorophosphate according to the present invention includes the steps of:

(a) dispersing toothpaste in a total ion strength adjustment buffer (TISAB);

(b) filtering the dispersed toothpaste of the step (a) to eliminate interfering substances;

(c) setting up a fluoride distillation apparatus comprising a reaction bottle for containing a sample, an absorbing device coupled to the top of the reaction bottle and open at both ends thereof, and an absorber placed in the absorbing device;

(d) pouring the centrifugal supernatant of the step (b) in the reaction bottom of the fluoride distillation apparatus and treating the supernatant with an acid;

(e) connecting the reaction bottom of the step (d) to the absorbing device and standing the reaction bottle in a water bath at 40 to 100° C. for 2 to 10 minutes to capture generated fluoride ions; and (f) determining the concentration of the fluoride ions captured in the step (e).

The conventional testing methods involve dispersing a sample in water or the like and adding TISAB in the final measurement step, whereas the present invention includes dispersing toothpaste in TISAB in the step (a) to block the bonding between free fluoride ions partly released from sodium monofluorophosphate as given by the following reaction mechanism 1 and interfering ions (e.g., calcium or aluminum ions released from the abrasive), leading to the enhanced precision of the final measurement results. Here, a variety of reagents similar to TISAB I to IV can also be used according to the type of the testing method.

$$AlF_3 \text{ or } CaF_2 \rightarrow F^-$$ [Reaction Mechanism 1]

Further, the present invention uses TISAB as a decomplexing agent prior to the filtration step to eliminate interfering ions more effectively and isolates fluoride ions from the interfering ions to enhance the precision of the measurement results. In other words, the conventional methods filter out the insoluble fluoride complex not released as $F^-$, whereas the present invention adds the decomplexing agent prior to the filtration to eliminate interfering ions and includes filtration performed after release of $F^-$, preventing a loss of $F^-$.

In addition, the present invention involves a physical filtration process for removal of the interfering substances to prevent a release of the interfering ions, such as $Ca^{2+}$ or $Al^{3+}$, caused by the acid used for hydrolysis of sodium monofluorophosphate in the step (b). The physical filtration method as used herein may include, if not specifically limited to, filtrations using centrifugal separation or filter papers.

In the present invention, the dispersed toothpaste is put into the reaction bottle in the fluoride distillation apparatus of the present invention and then subjected to hydrolysis of sodium monofluorophosphate using different acids, such as hydrochloric acid, sulfuric acid, or perchloric acid. As shown in the following reaction mechanism 2, sodium monofluorophosphate is hydrolyzed to release fluoride ions or generate hydrogen fluoride gas. Such an acid hydrolysis contributes to the enhanced precision and reproducibility of the measurement, time saving, and the increase in the counts of samples that can be processed each time.

$$MFP^- \rightarrow HF \text{ or } HF_2^-$$ [Reaction Mechanism 2]

After the hydrolysis of sodium monofluorophosphate with acid, the reaction bottle is connected to the absorbing device and kept in a water bath at 40 to 100° C. for 2 to 10 minutes to capture the generated fluoride ions. Here, an absorbent including an absorbent solution is placed in the absorbing device to capture fluoride ions. The absorbent solution is preferably used in an amount enough to soak the absorbent.

The reaction solution and the absorbent in the reaction bottle are put into a container such as a flask, and the liquid used to wash the absorbing device and the reaction bottle is added to the flask, after which the sample solution contained in the flask is measured in regard to the fluoride ion concentration with a fluoride ion measuring instrument.

Reference will be now made in detail to the preferred embodiment of the present invention with reference to the attached drawings. It is to be understood that modifications and variations of the present invention may be resorted to without departing from the technical idea and scope of the present invention as those skilled in the art readily understand. Such modifications, variations and all equivalent relationships are considered to be within the scope of the invention and the appended claims.

EXAMPLE 1

Preparation of Standard Fluoride Solution

Sodium fluoride (reagent level) was dried at 105° C. for 2 hours, and exactly 0.22 g of it was dissolved in water to prepare a 1 L solution. The 1 L solution thus obtained or an equivalent standard solution (standard solution for quantification) commercially available was used as a stock quantard solution (containing 100 μg/mL of $F^-$). 5 mL, 10 mL, or 20 mL of the stock standard solution was collected and mixed with water to make a 100 mL solution, each 4 mL of which was then mixed with 1.2 mL of hydrochloric acid, 0.4 mL of 0.1 mol/L sodium hydroxide solution, 4 mL of TISAB IV, and water to prepare a 20 mL solution as a standard solution. Each 10 mL of the standard solution was mixed with 6 mL of TISAB IV and measured under agitation with a fluoride ion measuring instrument.

Preparation of Sample Solution 0.4 g of toothpaste was weighed, mixed with TISAB IV to make a volume of 50 mL. The toothpaste well-dispersed in TISAB IV was kept at the room temperature for one hour under agitation. The resultant solution was subjected to centrifugal separation at 4,000 rpm for 10 minutes, and 10 mL of the supernatant was put into the reaction bottle 10 and mixed with 3 mL of hydrochloric acid.

About 0.1 g of absorbent cotton 21 was pressed into the absorbing device 20 and uniformly soaked with 1 mL of a 0.1 mol/L sodium hydroxide solution. The outer side of the absorbing device 20 corresponding to the inner side of the reaction bottle 10 being sand-smoothed. With the absorbing device 20 and the reaction bottle 10 coupled together, the fluoride distillation apparatus was put in a water bath at 80° C. and kept for 10 minutes so that the gas generated from the reaction bottle 10 was passed through the sodium hydroxide solution included in the absorbent cotton 21 of the absorbing device 20 and captured in the absorbing device 20. The fluoride distillation apparatus was cooled down and then kept at 4° C. for 3 minutes. The reaction solution and the absorbent cotton 21 were put into a 50 mL flask and then mixed with the water used to wash the absorbing device 20 and the reaction bottle 10 in the flask. An addition of water to the solution until the resultant sample solution became 50 mL. 10 mL of this sample solution was mixed with 6 mL of TISAB IV and measured under agitation in regard to the concentration (μg/L) of fluoride ions in the sample solution with a fluoride ion measuring instrument. The recovery (%) was calculated according to the following equation 1. The calculation results are presented in Table 2.

For comparison of the fluoride measurement values, the measurement results on the fluoride ion concentration using the conventional methods, such as distillation, diffusion, and spectrophotometry, are also presented in Table 2.

Recovery (%)=Measurement Value/Actual Fluorine Content×100 [Equation 1]

In this equation, the actual fluorine content refers to the content of sodium monofluorophosphate used in the preparation of the toothpaste.

TABLE 2

| Evaluation Method | Recovery (%) |
|---|---|
| Distillation | 94.7 |
| Diffusion | 89.4 |
| Spectrophotometry | 72.3 |
| Example 1 | 98.7 |

As can be seen from the results of Table 2, the recovery of the fluoride ion concentration measured in Example 1 of the present invention was higher than those obtained by the conventional methods, such as distillation, diffusion, or spectrophotometry.

The invention claimed is:

1. A fluoride distillation apparatus comprising:
 a reaction bottle for containing a sample;
 an absorbing device coupled to a top of the reaction bottle, the absorbing device being in the form of a tube that is open at both ends thereof; and
 an absorber disposed inside the absorbing device.

2. The fluoride distillation apparatus as claimed in claim 1, further comprising:
 a stopper for keeping the absorbent from dropping down.

3. The fluoride distillation apparatus as claimed in claim 2, wherein the stopper is provided in a double-tube form with a second tube narrower than the top of the absorbing device.

4. The fluoride distillation apparatus as claimed in claim 1, wherein the fluoride distillation apparatus is made of a material including plastic, glass, or plastic-coated glass.

5. The fluoride distillation apparatus as claimed in claim 4, further comprising:
 a weight provided in a bottom of the reaction bottle.

6. The fluoride distillation apparatus as claimed in claim 1, further comprising:
 a fixing device for coupling the reaction bottle and the absorbing device together.

7. A method for quantifying sodium monofluorophosphate using the fluoride distillation apparatus as claimed in claim 1.

8. The method as claimed in claim 7, wherein the quantifying method comprises:
 (a) dispersing toothpaste in a total ion strength adjustment buffer (TISAB);
 (b) filtering the dispersed toothpaste of the step (a) to eliminate interfering substances and form a centrifugal supernatant;
 (c) setting up a fluoride distillation apparatus comprising a reaction bottle for containing a sample, an absorbing device coupled to a top of the reaction bottle and open at both ends thereof, and an absorber indisposed inside the absorbing device;
 (d) pouring the centrifugal supernatant of the step (b) in the reaction bottle of the fluoride distillation apparatus and treating the supernatant with an acid;
 (e) connecting the reaction bottle of the step (d) to the absorbing device and standing the reaction bottle in a water bath at 40 to 100° C. for 2 to 10 minutes to capture generated fluoride ions; and
 (f) determining a concentration of the fluoride ions captured in the step (e).

9. The method as claimed in claim 8, wherein the acid used in the step (d) is selected from the group consisting of hydrochloric acid, sulfuric acid, and perchloric acid.

* * * * *